United States Patent [19]
Sluijter

[11] Patent Number: 5,355,481
[45] Date of Patent: Oct. 11, 1994

[54] DATA BASE ACCESS SYSTEM

[75] Inventor: Aloysius W. M. Sluijter, KH Alphen aan den Rijn, Netherlands

[73] Assignee: International Business Machines Corporation, Armonk, N.Y.

[21] Appl. No.: 988,384

[22] Filed: Dec. 8, 1992

Related U.S. Application Data

[63] Continuation of Ser. No. 434,153, Nov. 13, 1989, abandoned.

[30] Foreign Application Priority Data

Nov. 17, 1988 [EP] European Pat. Off. ........ 88119083.9

[51] Int. Cl.$^5$ ........................................... G06F 15/40
[52] U.S. Cl. ................. 395/600; 364/DIG. 2; 364/962.1; 364/962.3; 364/963; 364/963.3
[58] Field of Search ........................................ 395/600

[56] References Cited

U.S. PATENT DOCUMENTS

| | | | |
|---|---|---|---|
| 3,848,235 | 11/1974 | Lewis et al. | 340/172.15 |
| 3,853,399 | 12/1974 | Walsh | 355/64 |
| 4,099,242 | 7/1978 | Houston et al. | 364/200 |
| 4,633,393 | 12/1986 | Rundell | 364/200 |
| 4,811,199 | 3/1989 | Kuechler et al. | 364/200 |

FOREIGN PATENT DOCUMENTS 964373  3/1975  Canada ................................ 354/120

Primary Examiner—Gareth D. Shaw
Assistant Examiner—Kakali Chaki
Attorney, Agent, or Firm—Esther E. Klein; Pryor A. Garnett

[57] ABSTRACT

A method for accessing a stored data base comprising a number of blocks, each of said blocks containing a plurality of data files and a directory with access keys of the files stored in each of the respective blocks, and comprising means for effecting a sorted ordering of the data files such that the access keys in each block have a predetermined relation. Before the data base is accessed the directories of all blocks are read once in a predetermined order to determine the range of access keys in each directory. Thereafter, during each access operation first of all those directories are sorted out (identified) in which, based on the determined ranges of access keys, the search key of the requested data file might be present. Only blocks corresponding to the sorted out directories are then searched for the requested data file.

10 Claims, 5 Drawing Sheets

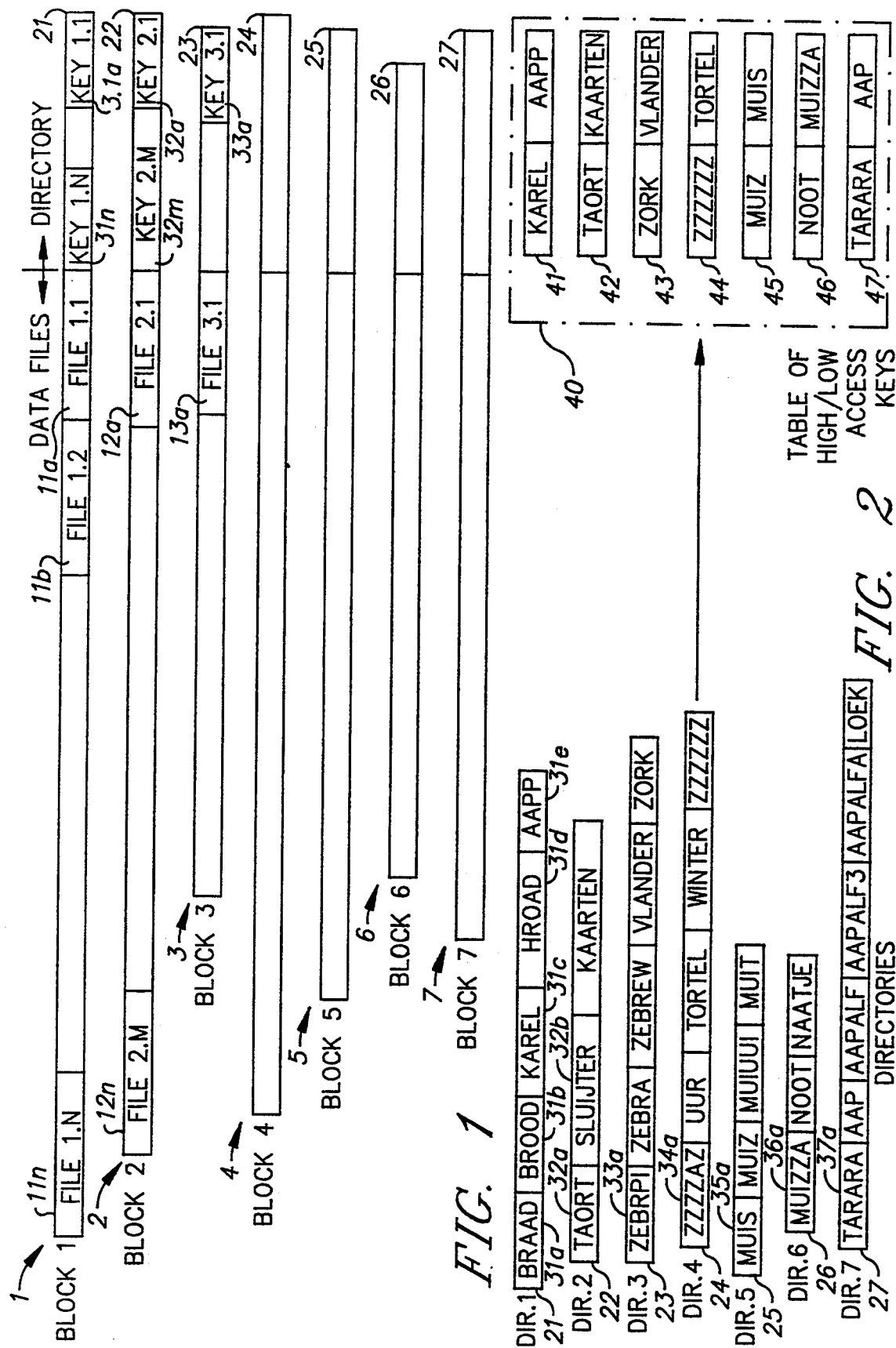

DATA BASE ACCESS SYSTEM

This is a continuation of application Ser. No. 07/434,143 filed Nov. 13, 1989, now abandoned.

BACKGROUND OF THE INVENTION

1. Technical Field

The invention relates to a computer system for accessing a stored data base comprising a number of blocks, each of said blocks containing a plurality of data files and a directory with the access keys of the files stored in each of the respective blocks, and comprising means for effecting a sorted ordering of the data files such that the access keys in each block have a predetermined relation.

2. Description of the Prior Art

In large computer systems having a processor, memory, and a storage device, a data base can be stored in the storage device as a plurality of data files arranged in plurality of blocks, wherein each data file is uniquely identified using an access key, and each block contains a directory of the access keys for the files in the respective block. When a data file is accessed (when updating or querying the data base), the access key is used to identify the data file that is to be accessed (the requested data file). When items such as data files in storage on a computer disk have to be sequentially searched (accessed and read) to locate a key, it would be impractical, and the performance would be low. In fact in average one-half of all items would have to be read in order to find the desired item. That would involve a relatively large number of disk read operations. In the past, efforts have been made to reduce this number of disk read operations.

An example of a system of the above mentioned type is described in the Canadian Patent 964.373. In this prior art system an appropriate file organization is provided, such that a data file can be read from a disk master file given the file name, by performing one seek and one read operation. The process of locating and reading a data file entails the hash coding of a file name to yield a block address, the moving of the read head to the disk area having the block address and the reading of the directory and the remainder of the block to read out the data file. During the reading of the directory, the data file names are compared in real time, as they are read from the disk, with the name of the desired data file. When a name match occurs, the address of the data file in the block and the address of the succeeding file in the same block are read and stored. As the disk rotates the desired data file address just read is constantly compared with the active disk address. When a match occurs the file has been located and is read out. The reading is terminated at the address of the beginning of the next file. If the file name is not found in the directory of the block indicated by the hash coding of the file's name, then the file is not present therein.

Although the access time to a specific data file is considerably reduced if the above described prior art system is applied, another disadvantage is introduced instead; i.e., the necessity to use a hash coding of all the file names. Through this hash coding the address of the block in which a specific file is stored can be retrieved. However, because of the hash coding this prior art method is not applicable to existing systems without changing the layout and the structure of at least the file names.

An object of the invention is now to provide a data base access system which can be applied to any arbitrary data base search mechanism without any change in the layout or structure of the search data and yet results into an appreciable reduction of the number of disk read operations and therewith of the file access time.

SUMMARY OF THE INVENTION

In agreement with the invention, a computer data base system of the type mentioned in the heading of this specification having a processor, memory, and storage device, is now characterized in that before the data base is accessed the directories of all blocks are read once in a predetermined order determining thereby the range of access keys in each directory, and that thereafter during each access operation first of all those directories are sorted out in which, based on the determined ranges of access keys, the search key (i.e. access key) of the requested data file might be present, whereafter only the blocks corresponding to the sorted out directories are searched for the requested data file. The searching of the directories to access data files can be achieved using a number of methods well known to those skilled in this field.

By establishing first of all a range of access keys for each block it is possible during a subsequent search operation to eliminate all those blocks of which the range of access keys does not fit the search key of the requested data file. Therewith the number of read operations can be reduced considerably. No specific coding of the access data is necessary, and therefore the invention can be applied in principle to any existing data base access system, the applications of which being understood by those skilled in this field.

It is preferred that the range of access keys in each directory be defined by the highest and lowest access key in the respective directory. By defining the range of access keys in each directory in this way the search key only has to be compared with two items; i.e., the before mentioned highest and lowest access key of the directory, to find out if the search key might be present within the range bounded by said highest and lowest search key or not. It will be clear that the terms "highest" and "lowest" are related to the way in which the data files are sorted.

Preferably the retrieved collection of access key ranges is stored in such a manner that these access key ranges are directly accessible to the data base access system without any separate read operations. Therewith any unnecessary delay in the search for a specific data file is avoided.

The invention will now be explained in more detail with reference to the attached drawings.

BRIEF DESCRIPTION OF THE DRAWINGS

FIG. 1 illustrates a number of physical blocks on a disk memory;

FIG. 2 illustrates the sorted directories of the storage blocks as well as the corresponding high/low access key table;

DETAILED DESCRIPTION OF THE PREFERRED EMBODIMENT

Figure 3:
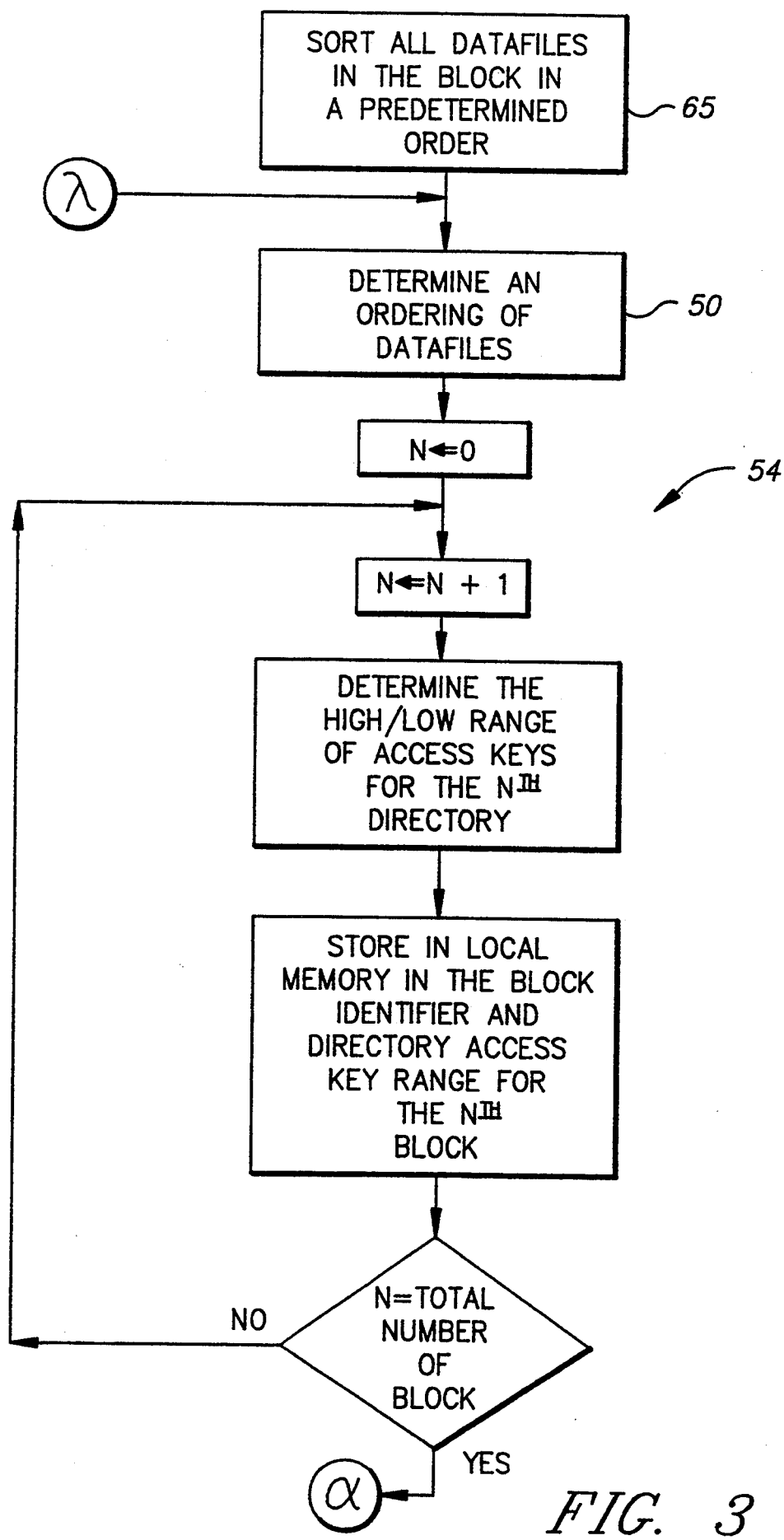
FIG. 3 illustrates a flowchart for creating a table of block access key ranges.

FIG. 1 illustrates a number of physical blocks on a computer's disk memory indicated by 1 . . . 7, each block comprising a number of data files 11a, 11b . . . 11n, 12a . . . 12m, 13a (shown on the left-hand side of FIG. 1) as well as a directory 21-27 in which the access keys 31a . . . 31n 32a . . . 32m, 33a for each of the data files in the related block are combined (shown on the right-hand side of FIG. 1). As an example, some data files stored in block 1 are indicated as file 1.1, file 1.2, . . . file 1.N 11a, 11b . . . 11n, and the corresponding keys in the directory section 21 are indicated by key 1.1, . . . key 1.N 31a . . . 31n.

Figure 4A:
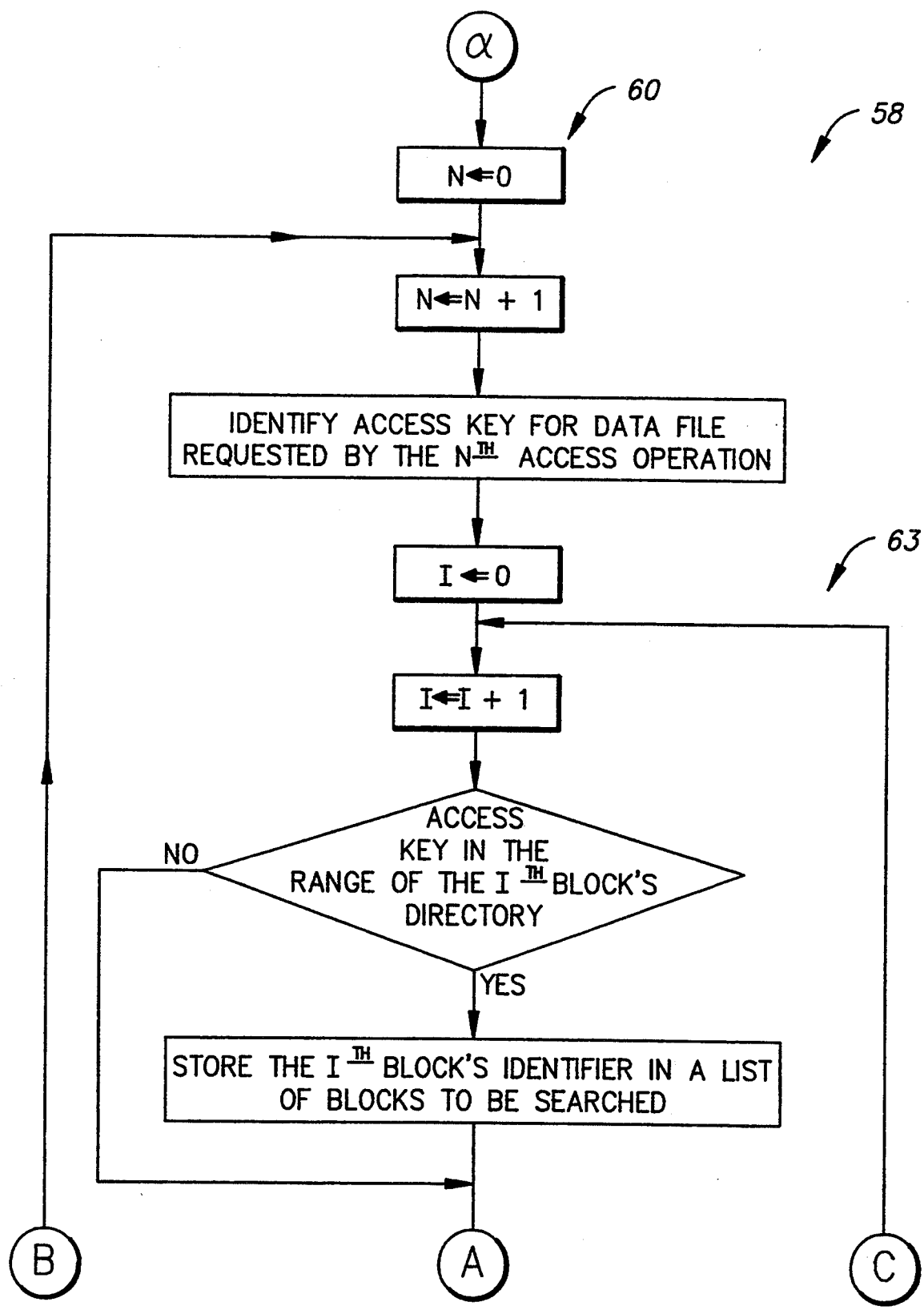
FIG. 4 illustrates a flowchart for using the range table of FIG. 2 to optimize block accesses.
Figure 4B:
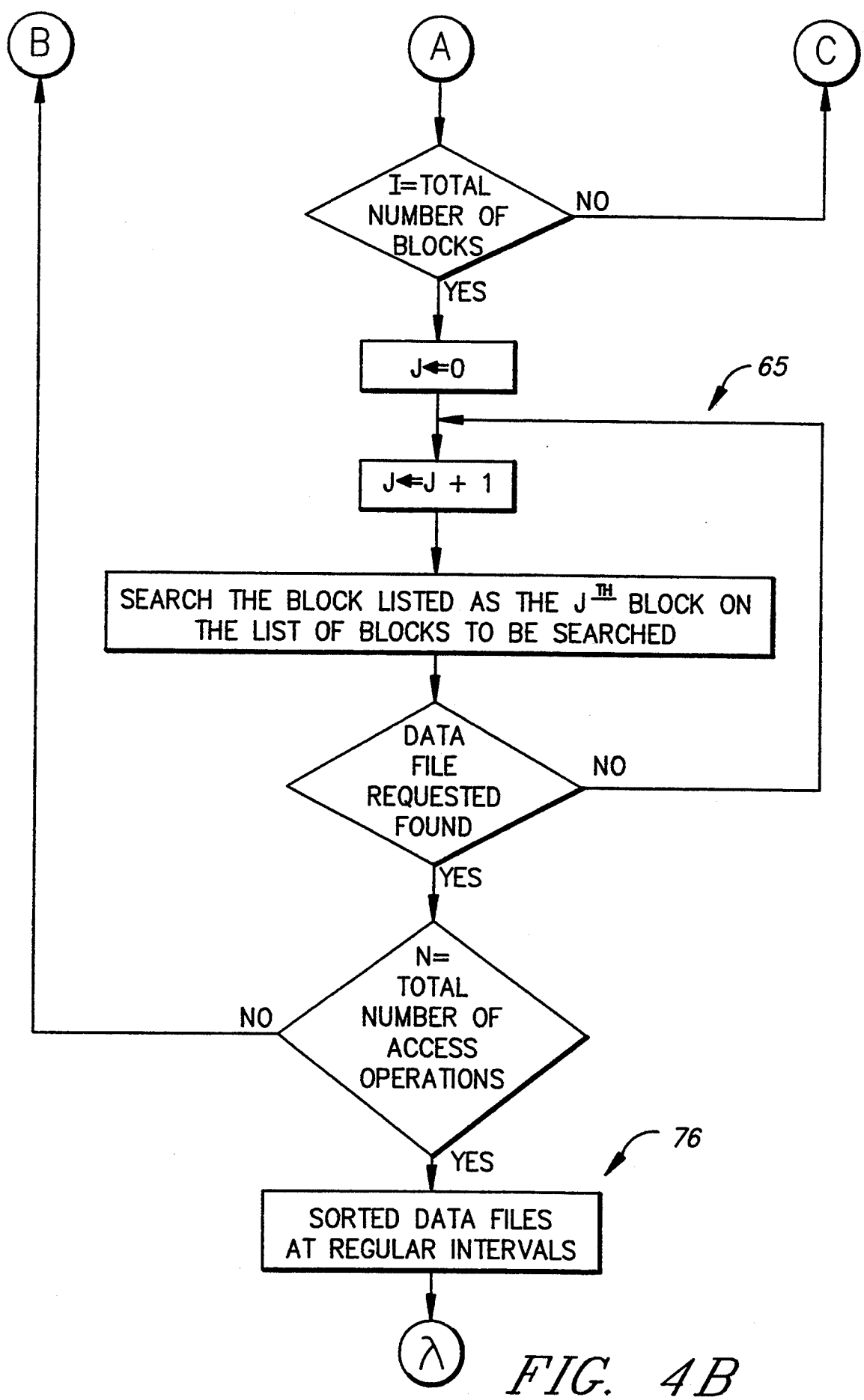

Referring to FIGS. 3 and 4, in accordance with the invention, all the various directories 21-27 are read by the computer processor once all in a predetermined order 50, for instance starting with block 1 and ending with block 7 (which order is, however, arbitrary) and for each directory the highest and lowest access key (in the sense of an alphanumerical ordering for example) are determined by reading all keys 31a . . . n, 32a . . . 32m, 33a . . . such that for each block a range 41-47 of possible keys is found 54. This is accomplished using computerized methods that are well known to those skilled in this field.

In FIG. 2, the sorted keys 31a–e, 32a, 33a, 34a, 35a, 36a, 37a, are illustrated assuming that each key is represented by an alphabetical string of characters, such as a codeword, password, etc. Examples of these passwords are shown in FIG. 2.

The directories 21-27 are shown on the left-hand side of FIG. 2. As is schematically indicated by the arrow in the middle of FIG. 2, the highest and lowest search keys (access keys) of each directory are retrieved and stored by the computer as a separate high/low table 40 of access keys (access key range table), that can be stored in local computer memory, shown schematically at the right-hand side of FIG. 2. The high/low table 40 is used to determine whether or not a specific search key of a requested data file might be present in a certain range block directory 58.

For example, suppose we want to search for files having the following search keys: BROOD, AAPALFA, MUIT, ZEBRA, TEACUP, and ZQQXXX. Starting with the first search key BROOD 60, by comparing this search key with the high/low table 40, it appears that the search key BROOD might be present in directories 1 and 7. The search key is certainly not present in all the other directories. The second search key AAPALFA might be present only in directory 7. The third search key MUIT might be present in the directories 2, 5 and 7. The fourth search key ZEBRA might be present in the directories 3 and 4. The search key TEACUP is not available in any of the directories, whereas the last search key ZQQXXX might be present only in directory 4. This is shown in Table 1 (see 63 in FIG. 4).

TABLE 1

| Locating File By Search Key | |
|---|---|
| Search Key | Can be located only in blocks: |
| BROOD | 1 and 7 |
| AAPALFA | 7 |
| MUIT | 2, 5 and 7 |
| ZEBRA | 3 and 4 |
| TEACUP | none |

TABLE 1-continued

| Locating File By Search Key | |
|---|---|
| Search Key | Can be located only in blocks: |
| ZQQXXX | 4 |

To locate the various search keys a maximum of nine disk reads are needed (see 65 in FIG. 4). However the average number of disk reads to find one of the search keys is actually fifty percent (50%) of the maximum, in other words the average number of disk reads necessary to find all these search keys is 9/2=4.5. Together with the initial seven disk reads needed to construct the high/low table 40 in a separated storage, the average number of disk reads necessary to find these six search keys is 11.5.

Without the high/low table 40, each of the seven directories 21-27 has to be accessed separately for each of the six search keys, which implies that a maximum of 42 disk reads would be necessary, with an average of 21 disk reads to find the actual six search keys.

The number of disk reads is therefore significantly decreased by implementing the invention.

It will be clear that the influence of the number of initial disk reads necessary to construct the high/low table 40 will be reduced as the number of subsequent search operations increases.

It will be clear furthermore that the number of disk operations will be reduced significantly if the files 11a–n, 12a–m, 13a . . . are better sorted before storing the files in the various blocks 1-7 65. Assuming that all the files are sorted in alphabetical order by access key 31a–n, 32a, . . . and thereafter stored in this order in the subsequent storage blocks 1-7, only one disk read operation will be necessary to find the file corresponding to a specific search key. A complete alphabetic sorting of all the files will lead to a situation in which none of the ranges 41-47 of access keys shows an overlap with any other range of access keys. In other words, for each search key there is only one range 41-47 of access keys available in which this specific search key might be present as access key.

In any active data base, not only search operations are carried out, but also update operations. In other words, data is added to the data base or deleted from the data base with the result that the alphabetical ordering of the files will be disturbed. The longer the data base will be used, the more the alphabetical ordering will disappear. It is therefore preferred to sort all the files at regular intervals to be sure that at least a certain degree of ordering is present 70, so that the application of the invention will lead to significant benefits.

Figure 5:
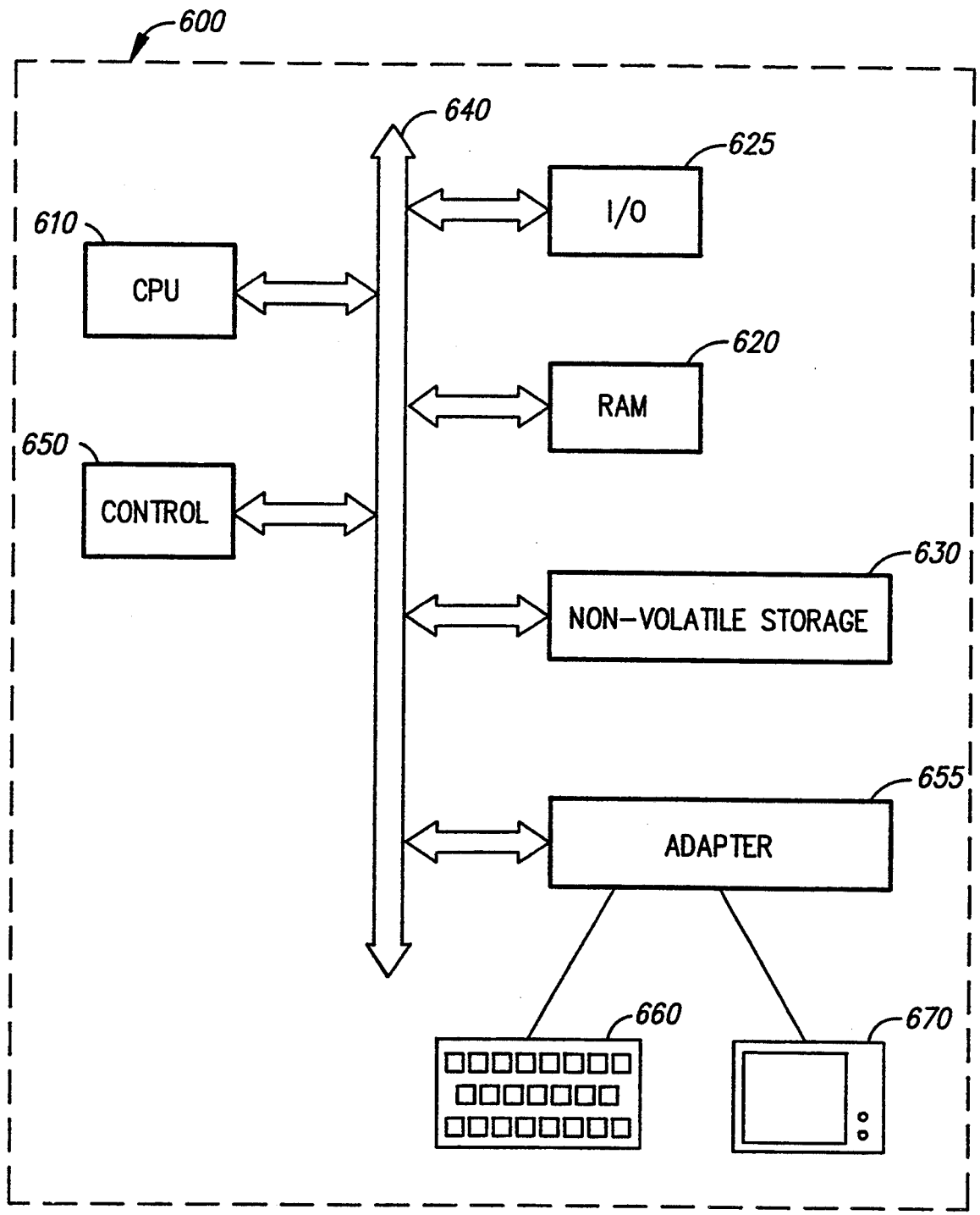
FIG. 5 illustrates a computer system used to implement the invention.

FIG. 5 shows by way of example data processing apparatus 600 with which the present invention may be practiced. The apparatus 600 comprises a central processing unit (CPU) 610, random access memory (RAM) 620, input/output (I/O) port 625, and nonvolatile storage 630 such as disk storage or read only memory (ROM), all connected to a common bus structure 640. Control circuitry 650 performs housekeeping operations such as providing appropriate clock signals and controlling the operation of the bus 640. An adapter 655 may be used interfaced to other components such as a keyboard 660 and a visual display unit (VDU) 670. The general purpose data processor shown in FIG. 5 is used to perform the invention under program control.

For experimental purposes the invention was applied to a data base in which descriptions are stored of users of a large computer system, whereby each user has access to only those parts of the computer system specified in his description. The user data base consists of a plurality of blocks of data on a disk storage medium. Each block on the disk storage has a size of 4k and offers space to accommodate up to 169 user descriptions. If prior art search techniques are used, whenever information about a user is needed the blocks have to be read one by one and scanned until the block with the relevant user is found. This would have dramatic consequences if very many users would try to log on to the system at about the same time. Such is normally the situation after a system restart. The response time would then be rather high during the first half hour or so, due to a long I/O queue for the directory. The whole data base covered about 1700 registered users and a comparison between prior art search methods and the method according to the invention resulted in the figures shown in Table 2.

TABLE 2

| Performance Comparison | | |
| --- | --- | --- |
| | Number of Reads | Elapsed time (sec.) |
| Prior Art Search Method: | | |
| Average | 52 | 2 |
| Worst case | 105 | 6 |
| Method According to the Invention: | | |
| Average | 1.2 | 0.4 |
| Worst case | 3 | 0.9 |

If the number of users in the above mentioned system would be extended to over 50,000, then the search mechanism based on the invention avoids approximately 300 reads to the directory each second.

I claim:

1. In a computerized method for accessing data files of a data base stored in a computer system having a processor, memory, and a storage device, the data base comprising a number of blocks that are stored in the computer storage device, each of said blocks containing a plurality of data files and a directory of all access keys of the files stored in each of the respective blocks, and comprising means for effecting a sorted ordering of the data files such that the access keys in each block have a predetermined relation, the improvement comprising the steps of:

before the data base is accessed to search for at least one data file stored in the storage device,
accessing and reading all of the access keys in the directories of all data base blocks once in a predetermined order;
using the computer processor to determine the range of the access keys in each directory by identifying the highest and lowest values of the access keys in each directory; and
storing in a range table the determined ranges of access keys for each block directory;
during each access operation to search for a requested data file stored in the storage device by means of an access key for the data file,
using said computer processor to sort out those directories in which, the access key of the requested data file falls within the determined ranges of access keys stored in the range table; and
using said computer processor to search only the blocks corresponding to the sorted out directories for the requested data file; and
after new data files are added to the data base each of said new data files having a new data file access key, and at least one of said block directories being updated to include new data file access keys for said new data files,
reading said directories once in said predetermined order;
determining updated ranges of access keys by identifying the highest and lowest values of the access keys in each updated directory; and
storing said updated ranges in said range table.

2. A method according to claim 1, wherein there is an overlap in access key ranges.

3. A method according to claim 2, wherein the highest and lowest access keys are determined by a collating sequence.

4. A method according to claim 3, wherein the collating sequence is alphanumeric.

5. A method according to claim 1 wherein the range table is stored in the computer memory so that the directory range values are directly accessible by the computer system.

6. A method according to claim 1 further including:
periodically sorting all data files of the complete data base in the said predetermined order so that there is no overlap in access key ranges, thereby reducing the number of blocks to be searched.

7. A method according to claim 6 wherein within said predetermined ordering in which the access keys are sorted, said access keys in each block have a small distance between the values of the access keys.

8. In a computer system comprising a processor, memory, and a storage device, having a data base stored in the storage device as a plurality of data files arranged in a plurality of blocks, where each of the data files has an access key for unique identification of said each of the data files, and each of the blocks has a block directory of the access keys for the data files in the respective block, a method performed by the processor for accessing an access data file stored in the storage device using an access key to identify the requested data file, said method comprising the steps of:

(a) for each of said blocks performing the steps of:
reading the access keys in each said block directory,
determining an access key range for said directory by
identifying the highest and lowest access keys in each directory, and
storing said access key range for said block in an access key range table so that said access key range table comprises a list of block identifiers with the access key range corresponding to a block identifier for a block stored in association with the block identifier;
(b) determining which of said blocks to search to locate said access data file by performing the steps of:
comparing the access key for said access data file to said plurality of access key ranges in said access key range table; and
identifying range blocks where the access key for said access data file falls within the access key range for said block;
(c) reading each said range block directories in a predetermined order until said access data file access key is located in a range block directory; and (d) after new data files are added to the data base each of said new data files having a new data file access key, and at least one of said block directories being updated to include each of said the new data file access keys, reading said directories once in said predetermined order, and determining updated ranges of access keys by identifying the highest and lowest access keys in each updated directory.

9. A method according to claim 8, further including the step of:

after new data files are added to the data base, each of said new data files having a new data file access number, and at least one of said block directories being updated to include each of said new data file access numbers, reading said directories once in said predetermined order, and determining updated ranges of access keys.

10. A method according to claim 9 further including: periodically sorting all data files of the complete data base in a predetermined order so that there is no overlap in access key ranges, thereby reducing the number of blocks to be searched.

* * * * *